3,033,517
SEALED GATE VALVE
Wallace G. Rovang, 600 Rhododendron Drive, Vancouver, Wash., and Albert F. Laurie, 7429 N. Chase Ave., Portland, Oreg.
Filed Mar. 18, 1958, Ser. No. 722,327
1 Claim. (Cl. 251—214)

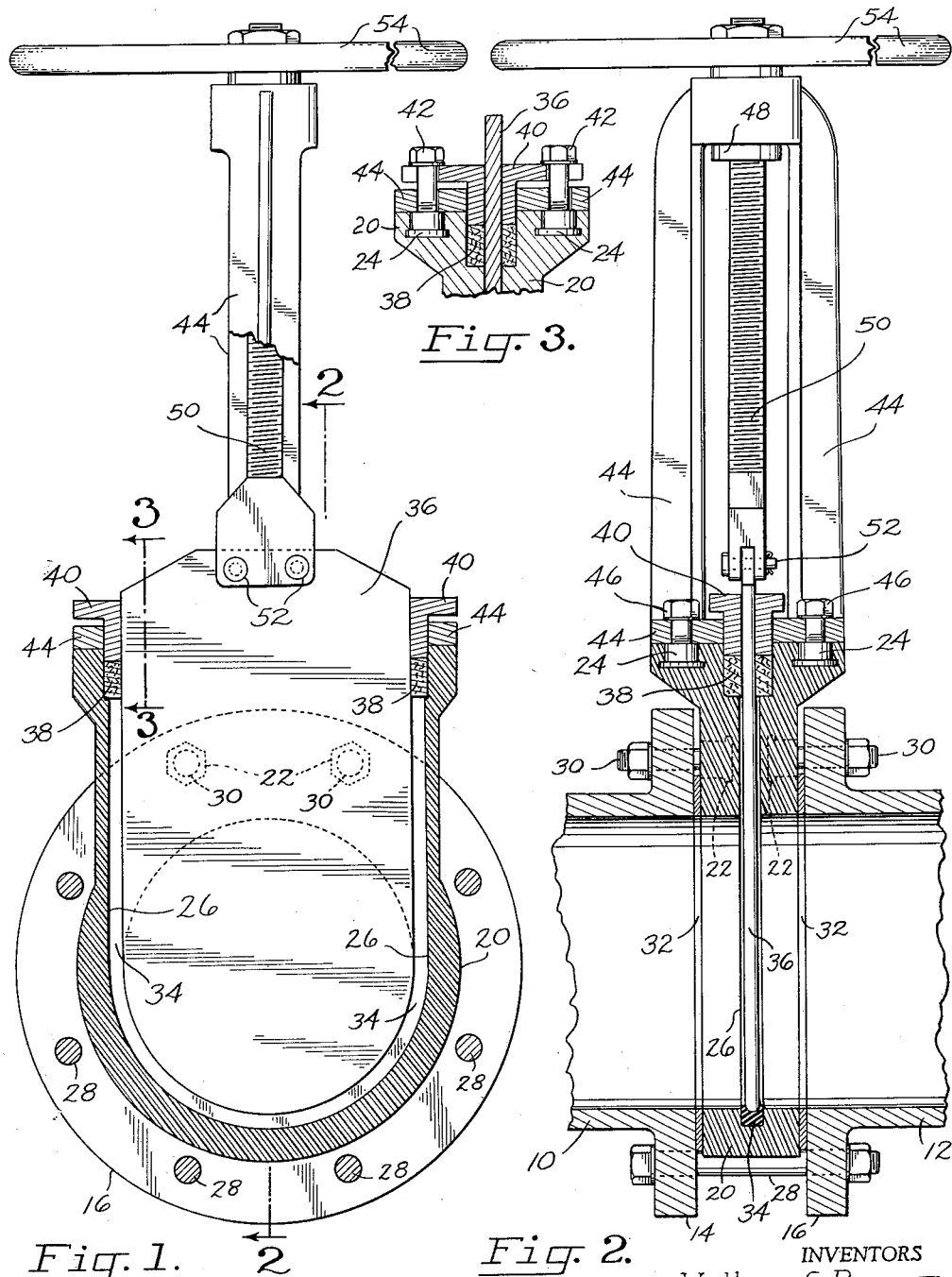

This invention relates to gate valves and pertains particularly to gate valves of the class employed for controlling the flow of heavy slurries such as the cellulose slurries handled in the papermaking art.

In the papermaking and related arts where heavy slurries are passed through conduits, a problem has been presented by the fact that the gate valves used for regulating the flow of the slurry through the conduits have not seated securely. As a consequence, the gate in the valve acts as a filter, filtering out the solid particles of the slurry and passing the fluid portion thereof. The filtered out solid particles then form a plug behind the gate, eventually sealing off the flow but also preventing proper functioning of the valve, or even plugging the line altogether, when it is sought to re-establish the flow. Also, the conventional gate valves of the prior art have a pocket or obstruction at the bottom of the valve. This collects foreign material, preventing tight closure of the valve. It also creates excessive turbulence and pressure drop when the valve is opened.

Accordingly it is the general object of the present invention to provide a gate valve which is tightly sealed, rendering it drip proof and also proof against the filtering and plugging characteristics outlined above.

It is a further object of the present invention to provide a gate valve which when included in a fluid line permits tight closing of the gate when the valve is closed but at the same time permits smooth flow of the fluid when the gate is open, thereby avoiding turbulence and pressure drop in the system.

The manner in which the foregoing and other objects of this invention are accomplished will be apparent from the accompanying specification and claim considered together with the drawings, wherein:

FIG. 1 is a longitudinal sectional view of the presently described sealed gate valve;

FIG. 2 is a transverse sectional view thereof taken along line 2—2 of FIG. 1; and FIG. 3 is a fragmentary detail sectional view looking in the direction of the arrows of line 3—3 of FIG. 1.

Broadly stated, the sealed gate valve of our invention comprises a body having an opening therethrough dimensioned to register substantially with the opening through a pair of conduits arranged coaxially therewith, the body having also a recess circumferentially located in the interior thereof and forming a guideway thereacross, means for interconnecting the body and the conduits, a sealing member disposed in the recess, and gate means in the guideway in sealing relationship to the sealing member.

Considering the foregoing in greater detail and with particular reference to the drawings:

The herein described gate valve is adapted for use in conduits such as those indicated at 10, 12. These have transversely perforated flanges 14, 16 through which they may be interconnected.

The gate valve includes a body member 20 formed with an opening dimensioned to substantially register with the openings through the conduits when the three members are axially aligned. Body 20 may be made of any suitable structural material, preferably of acid- and alkali-resistant plastic such as glass-reinforced, high impact polyester resin. It is provided with first threaded metal inserts 22 and second threaded metal inserts 24, and is formed with an internal circumferential recess 26.

The body member 20 is interconnected with aligned conduits 10, 12 by means of bolts 28 which extend through the flanges 14, 16, spanning the body of the valve, and by means of bolts 30 which are threaded into inserts 22. Gaskets 32 may be interposed between the conduits and the valve body.

A sealing member 34 rectangular in cross section is disposed in recess 26. It may be made of rubber, plastic, or other suitably resilient material.

A gate, made of metal, plastic, or other suitable structural material works in guideway 26 and is dimensioned to lie in sealed relationship with sealing member 34, the sealing edge of the gate 36 being rounded to form a blunt contact with member 34 whereby to prevent appreciable defacing of the latter and maintain a continuous smooth surface through the valve. It advances through a stuffing box 38 in the upper portion of the body (FIG. 3). The stuffing box packing is retained by means of stuffer 40 which is secured to the body by means of bolts 42 threaded into plastic inserts 24.

Also, the lower end of a yoke 44 is bolted to the upper portion of the body by means of bolts 46. The upper end of the yoke supports a stem nut 48 through which valve stem 50 is threaded. The lower end of the valve stem is pivotally connected to the upper end of gate 36 by means of pin 52. The upper end of the valve stem is attached to a hand wheel 54 by means of which the valve is operated.

Thus it will be apparent that as the valve operates, the gate is tightly sealed by member 34 at all times. This prevents valve leakage both externally and internally around the edges of the gate. It also prevents filtering out of any solid particles which may be contained in the valved fluid so that freedom from plugging is assured.

It is to be understood that the form of our invention herein shown and described is to be taken as a preferred example of the same and that various changes in the shape, size and arrangement of parts may be resorted to without departing from the spirit of our invention or the scope of the subjoined claim.

Having thus described our invention, we claim:

A sealed, bonnetless gate valve adapted for use in controlling the flow of liquid through a pair of aligned conduits, the gate valve comprising: a body formed with a central opening dimensioned to register substantially with the openings through the conduits, fastening means for fastening the body between the conduits, an internal U-shaped recess within the body communicating with the central opening and disposed with its plane substantially normal to the central axis of the conduits, a resilient sealing member of substantially rectangular cross section seated in U-shaped configuration within the recess, a gate working in the recess in sealing engagement with the sealing member, a stuffing box adjacent the gate, a quantity of packing in the stuffing box, a packing gland extending into the stuffing box in substantial alignment with the leg segments of the U-shaped sealing member, the thrust of the packing gland thereby being transmitted against the sealing member and retaining it in the recess against the unseating pressure of material in the conduits, a yoke fastened to the body, and valve operating means mounted on the yoke and fastened to the gate, the sealing member being wider than the gate is thick to provide, when the valve is closed, a laterally disposed edge strip formed of a gate-displaced portion of the resilient sealing member and providing a positive edge seal about the gate periphery.

References Cited in the file of this patent

UNITED STATES PATENTS

| | | |
|---|---|---|
| 2,194,262 | Allen | Mar. 19, 1940 |
| 2,329,315 | Allen | Sept. 14, 1943 |
| 2,401,123 | Volpin | May 28, 1946 |
| 2,829,862 | Wey | Apr. 8, 1958 |
| 2,832,564 | Williams | Apr. 29, 1958 |
| 2,934,313 | Allen | Apr. 26, 1960 |
| 2,942,841 | Stillwagon | June 28, 1960 |

FOREIGN PATENTS

| | | |
|---|---|---|
| 2,711 | Great Britain | of 1874 |